United States Patent [19]

Van Slyke

[11] Patent Number: 5,629,270
[45] Date of Patent: May 13, 1997

[54] THERMALLY STABLE OIL-BASE DRILLING FLUID

[75] Inventor: Donald C. Van Slyke, Brea, Calif.

[73] Assignee: Union Oil Company of California, El Segundo, Calif.

[21] Appl. No.: 268,801

[22] Filed: Jun. 30, 1994

[51] Int. Cl.$^6$ .................................................... C09K 7/06
[52] U.S. Cl. .................. 507/125; 507/105; 507/112; 507/117; 507/118; 507/119; 507/120; 507/124
[58] Field of Search ......................... 507/105, 112, 507/117, 118, 119, 120, 124, 125

[56] References Cited

U.S. PATENT DOCUMENTS

| | | | |
|---|---|---|---|
| 2,573,961 | 11/1951 | Fischer | 252/8.5 |
| 2,623,015 | 12/1952 | Fischer | 252/8.5 |
| 3,140,747 | 7/1964 | Mitacek | 175/66 |
| 3,351,079 | 11/1967 | Gibson | 137/13 |
| 3,912,683 | 10/1975 | O'Farrell | 260/29.7 |
| 4,007,149 | 2/1977 | Burton et al. | 260/29.7 |
| 4,153,588 | 5/1979 | Makowski et al. | 260/23.5 |
| 4,425,455 | 1/1984 | Turner et al. | 507/122 X |
| 4,425,461 | 1/1984 | Turner et al. | 507/122 X |
| 4,425,462 | 1/1984 | Turner et al. | 524/400 |
| 4,442,011 | 4/1984 | Thaler et al. | 252/8.5 M |
| 4,447,338 | 5/1984 | Lundberg et al. | 252/8.5 |
| 4,514,308 | 4/1985 | Clampitt et al. | 252/8.5 C |
| 4,537,688 | 8/1985 | Peiffer et al. | 507/122 X |
| 4,537,919 | 8/1985 | Agarwal et al. | 523/336 |
| 4,671,883 | 6/1987 | Connell et al. | 252/8.515 |

FOREIGN PATENT DOCUMENTS

| | | |
|---|---|---|
| 2212192 | 7/1989 | United Kingdom . |
| 93/09201 | 5/1993 | WIPO . |

OTHER PUBLICATIONS

SPE 13560 (1985).
IADG/SPE 19955 (1990).
Baroid 50/50, Invert Emulsion Drilling Fluid System: Maximum Performance With Minimum Oil Content, (May 1989).
World Oil's 1990 Guide to Drilling, Completion, and Workover Fluids, World Oil, Jun. 1990, pp. 69–108.

*Primary Examiner*—Philip Tucker
*Attorney, Agent, or Firm*—Gregory F. Wirzbicki; Shlomo R. Frieman

[57] ABSTRACT

Oil-base drilling fluids containing a non-sulfonated polymer and/or a non-organophilic clay maintain desirable rheological properties at elevated temperatures.

8 Claims, No Drawings

THERMALLY STABLE OIL-BASE DRILLING FLUID

BACKGROUND

The present invention relates to oil-base drilling muds or fluids and systems and processes for drilling a borehole in a subterranean formation.

Oil-base drilling fluids and techniques using such fluids for drilling boreholes in subterranean formations to recover hydrocarbons (e.g., oil and gas) are well known to those skilled in the art. These drilling fluids usually comprise oil, a weighting agent, a surfactant, and an organophilic clay. The five major functions of oil-base drilling fluids are (a) cooling and lubricating a drill bit, (b) cleaning drilled cuttings from the bottom of a borehole, (c) transporting the cuttings to the surface, (d) stabilizing the wellbore, and (e) allowing adequate formation evaluation.

In some circumstances, for example, when tripping a drillstring, running logs, performing fishing operations, or conducting other procedures during a drilling operation, the drilling fluid in the borehole remains stagnant and its temperature can reach, and remain at, the bottomhole temperature for several days. While this is normally not a problem, when an oil-base drilling fluid is maintained at bottomhole temperatures above 176.7° C. (350° F.), the organophilic clays in the fluid can degrade, detrimentally impacting the rheological properties of the drilling fluid. In particular, this degradation lowers the yield point and 3 rpm rheological values of the drilling fluid. Since these rheological values are indicative of the capacity of a drilling fluid to suspend drill cuttings and weighting agents, the organophilic clay degradation renders the drilling fluid less capable, if not incapable, of suspending solids and results in expensive drilling problems such as weighting agent sagging, fluid density variations, solids settling, stuck drillpipe, poor hole cleaning, excessive fluid loss to the formation, and poor cement jobs.

Numerous attempts have been made to solve the problem of organophilic clay degradation in drilling fluids used in high temperature operations. See, for example, U.S. Pat. No. 4,425,455, U.S. Pat. No. 4,425,461, U.S. Pat. No. 4,425,462, U.S. Pat. No. 4,447,338, U.S. Pat. No. 4,537,688, and SPE 13560, which documents are incorporated herein in their entireties by reference. These efforts are based on modifying oil-base drilling fluid formulations to include one or more sulfonated polymers. However, sulfonated polymers (e.g., sulfonated ethylene-propylene diene terpolymer (sulfonated-EPDM)) tend to be expensive and hard, if not impossible, to obtain. For example, it is believed that the sole known supplier for a sulfonated-EPDM (i.e., Tekmud 1949 brand sulfonated-EPDM) has not made the product available to the oil industry for over a year.

SUMMARY

Using readily available ingredients and employing an inexpensive polymer, the present invention provides alternative oil-base drilling fluids which exhibit comparable, if not better, rheological properties than sulfonated polymer-containing drilling fluids at temperatures in excess of 176.7° C. (350° F.). More specifically, the oil-base drilling fluid of the present invention comprises (i) oil, (ii) a weighting agent, (iii) a surfactant, and (iv) a non-sulfonated polymer, and/or (v) a non-organophilic clay. (As used in the specification and claims, the term "non-sulfonated polymer" means a polymer which contains less than 4 meq. of sulfonate groups per 100 grams of the polymer; and the term "non-organophilic clay" means a clay which has not been amine-treated to convert the clay from water-yielding to oil-yielding.)

In addition, a drilling system and a method for drilling a borehole are also provided by the invention. The drilling system comprises (a) a subterranean formation, (b) a borehole penetrating the subterranean formation, (c) a drill bit suspended in the borehole, and (d) the above drilling fluid located in the borehole and proximate the drill bit.

Regarding the borehole drilling method of the present invention, this method comprises rotating a drill bit at the bottom of a borehole in the presence of the aforesaid drilling fluid to pick up drill cuttings and to carry at least a portion of the drill cuttings out of the borehole.

DETAILED DESCRIPTION OF THE INVENTION

Without being bound by any particular theory of operation, it is believed that the oil-base drilling fluid of the present invention maintains its rheological properties upon aging at temperatures of about 176.7° C. (350° F.) and above by, among other things, the use of a non-sulfonated polymer and/or a non-organophilic clay. Exemplary non-organophilic clays include, but are not limited to, montmorillonite (bentonite), hectorite, saponite, attapulgite, and illite, with the preferred non-organophilic clays being bentonite and hectorite. The non-organophilic clays can be employed either individually or in combination.

Non-organophilic clays are believed to possess at least two advantages over organophilic clays previously used in oil-base drilling fluids. First, because non-organophilic clays are not amine-treated, they are less expensive than their corresponding organophilic clays. In addition, it is believed that at high temperatures, the amine group breaks off or otherwise separates from the organophilic clay, producing a modified clay which imparts inferior rheological properties to the resulting drilling fluid. In contrast, because non-organophilic clays are, by definition, not amine-treated, at elevated temperatures they impart better rheological properties to oil-base drilling fluids than temperature-degraded organophilic clays.

Exemplary non-sulfonated polymers include the organic polymers set forth in the following Table I.

TABLE I

| Class | Non-Sulfonated Polymers |
|---|---|
| | Species |
| Thermo-plastic | Rubber; polyvinyl chloride; nylons; fluorocarbons; linear polyethylene; polyurethane; polystyrene, poly(o-methylstyrene), poly(m-methylstyrene), poly(p-methylstyrene), poly(2,4-dimethylstyrene), poly(2,5-dimethylstyrene), poly(p-tert-butylstyrene), poly(p-chlorostyrene), poly(α-methylstyrene), co- and terpolymers of polystyrene, poly(o-methylstyrene), poly(m-methylstyrene), poly(p-methylstyrene), poly(2,4-dimethylstyrene), poly(2,5-dimethylstyrene), poly(p-tert-butylstyrene), poly(p-chlorostyrene), and poly(α-methylstyrene) with each other or with acrylonitrile, vinyl toluene, or methyl methacrylate; polypropylene; acrylic resins (e.g., polymers or copolymers of acrylic acid, methacrylic acid, esters of these acids (such as methyl acrylate, ethyl acrylate, butyl |

TABLE I-continued

| Class | Species |
|---|---|
| | acrylate, methyl methacrylate, ethyl methacrylate, butyl methacrylate, isobutyl methacrylate, isodecyl methacrylate, lauryl methacrylate, tridecyl methacrylate, stearyl methacrylate, 1,3-butylene dimethacrylate, trimethylolpropane trimethacrylate, t-butylaminoethyl methacrylate, hydroxypropyl methacrylate), or acrylonitrile; cellulosic resins (e.g., cellulose acetate, carboxymethyl cellulose, hydroxyaklyl cellulose (such as hydroxyethyl cellulose, hydroxy methyl cellulose); polyvinyl toluene; elastomers (unvulcanized); polybutadiene; polybutylene; polyisoprene; natural rubber |
| Thermo-set | Elastomers (vulcanized); crosslinked polyethylene; phenolics; alkyds; polyesters; ethylene-propylene-diene terpolymer (EPDM); butyl rubber; styrene-butadiene copolymers; polychloroprene; nitrile rubber; polysulfide rubber |

The non-sulfonated polymer employed in the present invention generally has a number average molecular weight of about 40,000 to about 120,000, a weight average molecular weight of about 250,000 to about 500,000, and a dispersity of about 3 to about 6. (As used in the specification and claims, the term "dispersity" means the ratio of the weight average molecular weight to the number average molecular weight.) The preferred non-sulfonated polymer is polystyrene.

Because sulfonation does not appear to significantly enhance the performance of the polymers employed in the drilling fluid of the present invention, the non-sulfonated polymers preferably contain less than about 3, more preferably less than about 2, even more preferably less than about 1, and most preferably about 0, meq. of sulfonate groups per 100 grams of the polymer. In terms of parts by weight sulfonated monomer, the non-sulfonated polymers generally contain less than about 0.5, preferably less than about 0.4, more preferably less than about 0.25, even more preferably less than about 0.1, and most preferably about 0, parts by weight sulfonated monomer.

Oils, surfactants, weighting agents, shale inhibiting salts, and fluid loss control agents typically used in oil-base drilling fluids are also suitable for use in the fluids of the present invention. For example, exemplary oils, surfactants, and weighting agents are described in U.S. Pat. No. 4,447,338 and U.S. Pat. No. 4,425,462. In addition, the oil can be a white mineral oil, such as the white mineral oils described in U.S. patent application Ser. No. 08/065,644, the foregoing document being incorporated herein in its entirety by reference.

Typical shale inhibiting salts are alkali metal and alkaline-earth metal salts. Calcium chloride and sodium chloride are the preferred shale inhibiting salts.

Illustrative fluid loss control agents include, but are not limited to, asphaltics (e.g., sulfonated asphaltenes and asphaltenes), lignite, gilsonite, and leonardite. The softening point of the fluid loss control agent is as high as possible, preferably at least about 148.9° C. (300° F.), and more preferably at least about 176.7° C. (350° F.). Due to its high softening point, gilsonite is a preferred fluid loss control agent. (Commercially available gilsonite has a softening point within the range of about 143.3° C. (290° F.) to about 204.4° C. (400° F.).) Leonardite is also a preferred fluid loss control agent.

The oil-base drilling fluids of the present invention optionally contain a sulfonated polymer and/or an organophilic clay. Sulfonated polymers are described in, for example, U.S. Pat. No. 4,425,455, U.S. Pat. No. 4,425,461, U.S. Pat. No. 4,425,462, U.S. Pat. No. 4,447,338, U.S. Pat. No. 4,537,688, and SPE 13560. Because they do not appear to significantly enhance the rheological properties of non-sulfonated polymer-containing drilling fluids of the present invention, preferably little, if any, sulfonated polymer is used in such drilling fluids. Accordingly, the concentration of the sulfonated polymer in non-sulfonated polymer-containing drilling fluids is generally less than about 0.143 g/m$^3$ (0.05 pounds per barrel (ppb)), preferably less than about 0.057 g/m$^3$ (0.02 ppb), more preferably less than about 0.029 g/m$^3$ (0.01 ppb), and most preferably about 0.

Formulations for the oil-base drilling fluids of the present invention are set forth in the following Table II:

TABLE II

| Ingredient | Typical | More Typical |
|---|---|---|
| Oil, volume %[a] | 25–85 | 40–60 |
| Surfactant[b] (active), | | |
| ppb[c] | 0.5–40 | 3–25 |
| kg/m$^3$ | 2.86–57.2 | 2.86–28.6 |
| Water, volume %[a] | up to 45 | 1–20 |
| Weighting agent, | | |
| ppb | up to 700 | 150–600 |
| kg/m$^3$ | up to 2002 | 429–1716 |
| Non-organophilic clay, | | |
| ppb | 0.05–15 | 0.1–10 |
| kg/m$^3$ | 0.143–42.9 | 0.286–28.6 |
| Non-sulfonated polymer, | | |
| ppb | 0.05–15 | 0.1–6 |
| kg/m$^3$ | 0.143–42.9 | 0.286–17.16 |
| Organophilic clay, | | |
| ppb | up to 15 | 0.1–6 |
| kg/m$^3$ | up to 42.9 | 0.286–17.16 |
| Shale inhibiting salt, | | |
| ppb | up to 60 | 5–30 |
| kg/m$^3$ | up to 171.6 | 143–85.8 |
| Lime[d], | | |
| ppb | up to 30 | 1–20 |
| kg/m$^3$ | up to 85.8 | 2.86–57.2 |
| Fluid loss control agent, | | |
| ppb | up to 30 | 2–20 |
| kg/m$^3$ | up to 85.8 | 5.72–57.2 |

[a]Volume percent is based on the total volume of the drilling fluid.
[b]As used in the specification and claims, the term "surfactant" means a substance that, when present at low concentration in a system, has the property of adsorbing onto the surfaces or interfaces of the system and of altering to a marked degree the surface or interfacial free energies of those surfaces (or interfaces). As used in the foregoing definition of surfactant, the term "interface" indicates a boundary between any two immiscible phases, and the term "surface" denotes an interface where one phase is a gas, usually air. Exemplary ingredients referred to as surfactants by those skilled in the art include emulsifiers and oil wetting agents.
[c]The pounds per barrel (ppb) is based upon the final composition of the drilling fluid.
[d]As used in the specification and claims, the term "lime" means quicklime (CaO), quicklime precursors, and hydrated quicklime (e.g., slaked lime (Ca(OH)$_2$)).

The properties (e.g., oil to water ratio, density, etc.) of the of the oil-base drilling fluids can be adjusted to suit any drilling operation. For example, the drilling fluid of the present invention is usually formulated to have a volumetric ratio of oil to water of about 100:0 to about 40:60 and a density of about 0.9 kg/l (7.5 pounds per gallon (ppg)) to about 2.4 kg/l (20 ppg). More commonly, the density of the drilling fluid is about 1.1 kg/l (9 ppg) to about 2.3 kg/l (19 ppg).

In addition, the weight ratio of the non-sulfonated polymer to the non-organophilic clay is generally about 1:4 to about 4:1 and more commonly about 1:3 to about 3:1. However, the best, consistent initial and aged yield points and initial and aged 3 rpm readings are obtained when the weight ratio of the non-sulfonated polymer to the non-organophilic clay is about 1:2 to about 2:1, all other parameters being held constant.

Likewise, in terms of the ratio of non-organophilic clay to organophilic clay, the weight ratio of the non-organophilic having a density of about 2.16 kg/l (about 18 ppg) and within the scope of the present invention were formulated by sequentially adding ingredients in the order set forth in Table A. After the addition of each ingredient, the resulting composition was mixed for the indicated mixing time prior to adding a subsequent ingredient to the composition.

TABLE A

| Component | Examples 1 | 2 | 3 | 4 | 5 | 6 | Mixing Time, minutes |
| --- | --- | --- | --- | --- | --- | --- | --- |
| Diesel, ml | 164.5 | 164.5 | 164.5 | 164.5 | 164.5 | 164.5 | |
| Invermul NT brand primary emulsifier, ml | 8.5 | 8.5 | 8.5 | 8.5 | 8.5 | 8.5 | |
| Lime, g | 8.0 | 8.0 | 8.0 | 8.0 | 8.0 | 8.0 | |
| Duratone HT brand fluid loss control agent, g | 10.0 | 10.0 | 10.0 | 10.0 | 10.0 | 10.0 | 20 |
| Brine solution | | | | | | | 10 |
| $CaCl_2$, g | 12.1 | 12.1 | 12.1 | 12.1 | 12.1 | 12.1 | |
| Water, ml | 23.8 | 23.8 | 23.8 | 23.8 | 23.8 | 23.8 | |
| Bentone 38 brand organophilic clay, g | 1.0 | 2.0 | 3.0 | 2.0 | 2.0 | 1.0 | 20 |
| EZ Mul NT brand oil wetting agent, ml | 6.0 | 6.0 | 6.0 | 6.0 | 6.0 | 6.0 | 10 |
| Barite, g | 572 | 572 | 572 | 572 | 572 | 572 | 20 |
| Styrene-butadiene polymer[a], g | 0 | 0 | 0 | 0 | 0 | 2.0 | 10 |
| Polystyrene[b], g | 3.0 | 3.0 | 3.0 | 4.0 | 2.0 | 3.0 | 10 |
| Bentonite, g | 3.0 | 3.0 | 3.0 | 2.0 | 4.0 | 3.0 | 35 |

[a]76 RES 4470 brand styrene-butadiene polymer.
[b]76 RES 7116 brand polystyrene.

clay to organophilic clay is typically about 4:1 to about 1:4 and more often about 3:1 to about 1:3, with the best, consistent initial and aged yield points and initial and aged 3 rpm readings being obtained when the weight ratio of the non-organophilic clay to organophilic clay is about 2:1 to about 1:2, all other parameters being held constant.

The drilling fluid is preferably prepared by mixing the constituent ingredients in the following order: (a) oil, (b) emulsifier, (c) lime, (d) fluid loss control agent, (e) an aqueous solution comprising water and the shale inhibiting salt, (f) organophilic clay, (g) oil wetting agent, (h) weighting agent, (i) non-sulfonated polymer, and (j) non-organophilic clay. When employed, the sulfonated polymer is generally added before or after the non-sulfonated polymer.

EXAMPLES

The following examples (which are intended to illustrate and not limit the invention, the invention being defined by the claims) compare various properties of exemplary oil-base drilling fluids within the scope of the present invention (Examples 1–6) with a prior art oil-base drilling fluid (Comparative Example 7).

EXAMPLES 1–6

Six oil-base drilling fluids (3 lab barrels per drilling fluid formulation, with each lab barrel containing about 350 ml)

The 76 RES 7116 brand polystyrene employed in Examples 1–6 had a number average molecular weight of about 82,000, a weight average molecular weight of about 380,000, and a Z average molecular weight of about 1,130,000. 76 RES 7116 brand polystyrene is currently available from Rohm & Haas Company as Rov. 7116.

One sample from each of the different drilling fluid formulations prepared in Examples 1–6 was used to check the initial rheological properties. Samples to be aged were tested in duplicate, i.e., two samples of each drilling fluid formulation were aged for about 72 hours. The age-tested samples were placed into aging bombs in the presence of about 790.8 kpascal (100 psi) nitrogen and rolled at about 190.6° C. (375° F.). After aging, the amount of top oil separation was measured and the consistency of the drilling fluid noted. The age-tested samples were then remixed and their rheological properties checked. Unless otherwise noted below in Table B, both the initial and age-tested rheological properties were measured at about at 48.9° C. (120° F.) according to procedures described in *Recommended Practice—Standard Procedure for Field Testing Drilling Fluids*, API Recommended Practice 13B-2 (RP 13B-2), Second Edition, Dec. 1, 1991, American Petroleum Institute, Washington, D.C. (hereinafter referred to as "API"), API being incorporated herein in its entirety by reference. The measured results are set forth in Table B.

TABLE B

| Property | Examples | | | | | | | | | | | |
|---|---|---|---|---|---|---|---|---|---|---|---|---|
| | 1 | | 2 | | 3 | | 4 | | 5 | | 6 | |
| | I[a] | A[b] | I | A | I | A | I | A | I | A | I | A |
| Dial reading[c], | | | | | | | | | | | | |
| 600 rpm | 112 | 128 | 125 | 157 | 149 | 190 | 115 | 154 | 142 | 156 | 160 | 164 |
| 300 rpm | 63 | 69 | 71 | 90 | 89 | 115 | 67 | 87 | 85 | 88 | 87 | 86 |
| 200 rpm | 48 | 50 | 54 | 67 | 71 | 88 | 51 | 67 | 69 | 65 | 70 | 64 |
| 100 rpm | 30 | 29 | 35 | 40 | 46 | 54 | 32 | 40 | 44 | 38 | 44 | 35 |
| 6 rpm | 8 | 6 | 11 | 10 | 14 | 18 | 10 | 12 | 14 | 10 | 14 | 6 |
| 3 rpm | 7 | 6 | 9 | 9 | 12 | 17 | 8 | 11 | 12 | 9 | 13 | 5 |
| PV[d], | | | | | | | | | | | | |
| cp | 49 | 59 | 54 | 67 | 60 | 75 | 48 | 67 | 57 | 68 | 73 | 78 |
| N-sec/m$^2$ (10$^3$) | 49 | 59 | 54 | 67 | 60 | 75 | 48 | 67 | 57 | 68 | 73 | 78 |
| YP[e], | | | | | | | | | | | | |
| lb/100 ft$^2$ | 14 | 10 | 17 | 23 | 29 | 40 | 19 | 20 | 28 | 20 | 14 | 8 |
| kg/10 m$^2$ | 6.8 | 4.9 | 8.3 | 11.2 | 14.2 | 19.5 | 9.3 | 9.8 | 13.7 | 9.8 | 6.8 | 3.9 |
| Gel Strength[f], | | | | | | | | | | | | |
| 10 sec, | | | | | | | | | | | | |
| lb/100 ft$^2$ | 8 | 10 | 11 | 15 | 14 | 25 | 10 | 18 | 14 | 17 | 14 | 6 |
| kg/10 m$^2$ | 3.9 | 4.9 | 5.4 | 7.3 | 6.8 | 12.2 | 4.9 | 8.8 | 6.8 | 8.3 | 6.8 | 2.9 |
| 10 min, | | | | | | | | | | | | |
| lb/100 ft$^2$ | 10 | 33 | 13 | 50 | 16 | 64 | 12 | 48 | 15 | 48 | 19 | 29 |
| kg/10 m$^2$ | 4.9 | 16.1 | 6.3 | 24.4 | 7.8 | 31.2 | 5.9 | 23.4 | 7.3 | 23.4 | 9.3 | 14.2 |
| HTHP fluid loss[g], ml | 2.0 | 2.4 | 2.6 | 2.6 | 2.4 | 3.4 | 1.6 | 3.0 | 2.0 | 4.4 | 2.4 | 3.0 |
| ES[h], volts | 626 | 726 | 511 | 237 | 683 | 970 | 642 | 903 | 582 | 237 | 401 | 590 |
| Top oil separation[i], ml | | 33 | | 22 | | 15 | | 28 | | 16 | | 20 |

[a]"I" denotes "initial."
[b]"A" denotes aged.
[c]Dial readings were obtained using a 115-volt motor driven viscometer and measured according to the procedure described in API, pages 9–10, sections 2.4 to 2.5.
[d]PV was determined in accordance with the procedure and calculations discussed in API, page 10, sections 2.5 to 2.6.
[e]YP was determined in accordance with the procedure and calculations discussed in API, page 10, sections 2.5 to 2.6.
[f]Gel strength for 10 seconds and 10 minutes was determined in accordance with the procedure discussed in API, page 10, section 2.5, paragraphs f and g, respectively.
[g]HTHP denotes "high-temperature/high-pressure test" and was determined in accordance with the procedure discussed in API, pages 13–14, section 3.
[h]"ES" denotes "electrical stability" and was measured in accordance with the procedure discussed in API, pages 21–22, section 6.
[i]Top oil separation was determined by decanting and measuring the oil layer above the solids in the age-tested drilling fluid present in aging bomb.

The data listed in Table B indicates an interesting trend exhibited by the oil-base drilling fluids of the present invention. In particular, as previously noted, 3 rpm and yield point rheological values indicate the capacity of a drilling fluid to suspend drill cuttings and weighting agents. As shown in Table B, for oil-base drilling fluids within the scope of the present invention, the 3 rpm and yield point values of aged, heat-treated drilling fluids tend to be similar to, or higher than, those of their corresponding pre-aged fluids. In fact, under the test conditions employed in Examples 1–6, the ratio of the 3 rpm reading of the aged oil-based drilling fluids to the 3 rpm reading of the unaged oil-base drilling fluid tended to be at least about 0.7:1. Preferably, this ratio is about 0.7:1 to about 1.5:1, more preferably about 0.8:1 to about to about 1.5:1, even more preferably about 0.85:1 to about 1.4:1, and most preferably about 0.9:1 to about 1.4:1.

COMPARATIVE EXAMPLE 7

In comparative Example 7, an oil-base drilling fluid (3 lab barrels, with each lab barrel containing about 350 ml) having a density of about 2.16 kg/l (about 18 ppg) and outside the scope of the present invention was formulated by sequentially adding ingredients in the order set forth in Table C. After the addition of each ingredient, the resulting composition was mixed for the indicated mixing time prior to adding a subsequent ingredient to the composition.

TABLE C

| Component | Example 7 | Mixing Time, minutes |
|---|---|---|
| Diesel, ml | 164.5 | |
| Invermul NT brand primary emulsifier, ml | 8.5 | |
| Lime, g | 6.0 | |
| Duratone HT brand fluid loss control agent, g | 10.0 | 20 |
| Brine solution | | 10 |
| CaCl$_2$, g | 12.1 | |
| Water, ml | 23.8 | |
| Bentone 38 brand organophilic clay, g | 2.0 | 20 |
| EZ Mul NT brand oil wetting agent, ml | 4.2 | 10 |
| Barite, g | 572 | 20 |

One sample of the drilling fluid formulated as described in above Table C was checked for initial rheological properties. Samples to be aged were tested in duplicate, i.e., two samples of the drilling fluid were aged for about 72 hours. The age-tested samples were placed into aging bombs in the presence of about 790.8 kpascal (100 psi) nitrogen and rolled at about 190.6° C. (375° F.). After aging, the amount of top oil separation was measured and the consistency of the drilling fluid noted. The age-tested samples were then remixed and their rheological properties checked. Unless otherwise noted below in Table D, both the initial and age-tested rheological properties were measured at about at 48.9° C. (120° F.) according to procedures described in API. The measured results are set forth in Table D.

TABLE D

| Property | Comparative Example 7 | |
|---|---|---|
| | I[a] | A[b] |
| Dial reading[c], | | |
| 600 rpm | 118.5 | 99 |
| 300 rpm | 66 | 47 |
| 200 rpm | 48.5 | 32.5 |
| 100 rpm | 31 | 18.5 |
| 6 rpm | 8 | 3 |
| 3 rpm | 7 | 2 |
| PV[d], | | |
| cp | 52.5 | 52 |
| N-sec/m²(10³) | 52.5 | 52 |
| YP[e], | | |
| lb/100 ft² | 13.5 | −5 |
| kg/10 m² | 6.6 | −2.4 |
| Gel Strength[f], | | |
| 10 sec, | | |
| lb/100 ft² | 8.5 | 4 |
| kg/10 m² | 4.1 | 2.0 |
| 10 min, | | |
| lb/100 ft² | 11 | 9.5 |
| kg/10 m² | 5.4 | 4.6 |
| HTHP fluid loss[g], ml | 3.0 | 3.8 |
| ES[h], volts | 405 | 439 |
| Top oil separation[i], ml | | 17.5 |

[a]–[i]Same as footnotes to above Table B.

In contrast to the trend exhibited by drilling fluids within the scope of the present invention, the 3 rpm and yield point values of a prior art aged, heat-treated oil-base drilling fluid, as shown in Table D, are significantly less than the respective pre-aged values of the same prior art drilling fluid. Accordingly, the prior art fluid tested in Example 7 does not have the advantage of the oil-base drilling fluids of the present invention to yield aged, heat-treated drilling fluid 3 rpm and yield point values similar to, or higher than, the pre-aged drilling fluid 3 rpm and yield point values.

Although the present invention has been described in detail with reference to some preferred versions, other versions are possible. Therefore, the spirit and scope of the appended claims should not necessarily be limited to the description of the preferred versions contained herein.

What is claimed is:

1. An oil-base drilling fluid having a density of about 0.9 kg/l (7.5 pounds per gallon (ppg)) to about 2.4 kg/l (20 ppg) and comprising:

(a) an oil, (b) a weighting agent, (c) a surfactant, (d) a non-organophilic clay, (e) a non-sulfonated polystyrene; and (f) less than about 0.143 g/m³ (0.05 pounds per barrel (ppb)) sulfonated polymer.

2. The oil-base drilling fluid of claim 1 comprising less than about 0.057 g/m³ (0.02 ppb) sulfonated polymer.

3. The oil-base drilling fluid of claim 1 comprising less than about 0.029 g/m³ (0,01 ppb) sulfonated polymer.

4. The oil-base drilling fluid of claim 1 comprising about 0 g/m³ sulfonated polymer.

5. The oil-base drilling fluid of claim 1 where the non-organophilic clay is selected from the group consisting of montmorillonite, bentonite, hectorite, saponite, attapulgite, illite, or mixtures thereof.

6. The oil-base drilling fluid of claim 1 where the non-organophilic clay is selected from the group consisting of bentonite, hectorite, or mixtures thereof.

7. The oil-base drilling fluid of claim 1 comprising about 0 g/m³ sulfonated polymer and where the non-organophilic clay is selected from the group consisting of bentonite, hectorite, or mixtures thereof.

8. A method for drilling a borehole in a subterranean formation, the method comprising the steps of:

(a) rotating a drill bit at the bottom of the borehole and (b) introducing a drilling fluid into the borehole (i) to pick up drill cuttings and (ii) to carry at least a portion of the drilling cuttings out of the borehole, where the drilling fluid is the oil-base drilling fluid of claim 1.

* * * * *